US012752201B2

(12) United States Patent
Li

(10) Patent No.: US 12,752,201 B2
(45) Date of Patent: Oct. 6, 2026

(54) INFORMATION PUSHING METHOD, DEVICE, AND STORAGE MEDIUM

(71) Applicant: NETEASE (HANGZHOU) NETWORK CO., LTD., Hangzhou (CN)

(72) Inventor: Guang Li, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 254 days.

(21) Appl. No.: 18/559,836

(22) PCT Filed: Nov. 23, 2021

(86) PCT No.: PCT/CN2021/132551
§ 371 (c)(1),
(2) Date: Nov. 9, 2023

(87) PCT Pub. No.: WO2022/237121
PCT Pub. Date: Nov. 17, 2022

(65) Prior Publication Data

US 2024/0238680 A1 Jul. 18, 2024

(30) Foreign Application Priority Data

May 10, 2021 (CN) ........................ 202110507548.5

(51) Int. Cl.
*A63F 13/87* (2014.01)
*A63F 13/79* (2014.01)

(52) U.S. Cl.
CPC .............. *A63F 13/87* (2014.09); *A63F 13/79* (2014.09)

(58) Field of Classification Search
CPC ................................ A63F 13/87; A63F 13/79
See application file for complete search history.

(56) References Cited

U.S. PATENT DOCUMENTS 7,288,028 B2 * 10/2007 Rodriquez ............ A63F 13/795 463/40
10,874,947 B2 * 12/2020 Benedetto ............... A63F 13/35
(Continued)

FOREIGN PATENT DOCUMENTS

CN 106504100 A 3/2017
CN 109999509 A 7/2019
(Continued)

OTHER PUBLICATIONS

1st Office Action dated Nov. 23, 2023 for Chinese Application No. 202110507548.5.
(Continued)

*Primary Examiner* — Jeffrey K Wong
(74) *Attorney, Agent, or Firm* — Qinghong Xu

(57) ABSTRACT

The present disclosure provides an information pushing method, a device, and a storage medium. The method includes: receiving a request for guidance initiated by a second player via a second terminal in the chat interface; acquiring, in response to a reply operation by a first player to the request for guidance via a first terminal, a target tutorial corresponding to the reply operation from a plurality of tutorials; and sending the target tutorial to the second terminal of the second player, the target tutorial being configured to guide the second player to play a game.

13 Claims, 15 Drawing Sheets

(56) References Cited

U.S. PATENT DOCUMENTS

| | | | | |
|---|---|---|---|---|
| 2005/0108402 | A1 * | 5/2005 | Colson | G06Q 10/107 709/227 |
| 2007/0111794 | A1 * | 5/2007 | Hogan | A63F 13/335 463/42 |
| 2007/0167235 | A1 * | 7/2007 | Naicker | G07F 17/3244 463/42 |
| 2008/0015006 | A1 * | 1/2008 | George | G07F 17/32 463/17 |
| 2009/0181774 | A1 * | 7/2009 | Ratcliff | A63F 13/12 463/42 |
| 2010/0205148 | A1 | 8/2010 | Leblanc et al. | |
| 2012/0083343 | A1 * | 4/2012 | Wu | G07F 17/3286 463/42 |
| 2013/0059656 | A1 * | 3/2013 | Kim | A63F 13/79 463/29 |
| 2014/0073434 | A1 * | 3/2014 | Yukishita | A63F 13/10 463/42 |
| 2014/0274383 | A1 | 9/2014 | Kwok et al. | |
| 2017/0246545 | A1 | 8/2017 | Wilhite et al. | |
| 2017/0353568 | A1 | 12/2017 | Kozma et al. | |
| 2018/0229128 | A1 | 8/2018 | Chandrasekaran et al. | |

FOREIGN PATENT DOCUMENTS

| | | | |
|---|---|---|---|
| CN | 110213648 | A | 9/2019 |
| CN | 110473535 | A | 11/2019 |
| CN | 111035934 | A | 4/2020 |
| CN | 111084991 | A | 5/2020 |
| CN | 111147353 | A | 5/2020 |
| CN | 112245928 | A | 1/2021 |
| CN | 112601589 | A | 4/2021 |
| CN | 113244626 | A | 8/2021 |
| EP | 3133779 | A1 | 2/2017 |

OTHER PUBLICATIONS

International Search Report dated Feb. 17, 2022 of International Application No. PCT/CN2021/132551.

Notice of Allowance dated Apr. 19, 2024 for Chinese Application No. 202110507548.5.

* cited by examiner

INFORMATION PUSHING METHOD, DEVICE, AND STORAGE MEDIUM

CROSS-REFERENCE TO RELATED APPLICATIONS

The present disclosure is a U.S. national phase application of International Application No. PCT/CN2021/132551, filed on Nov. 23, 2021, which is based on and claims priority to Chinese Patent Application No. 202110507548.5, filed with the Chinese Patent Office on May 10, 2021, titled "INFORMATION PUSHING METHOD AND APPARATUS, DEVICE, AND STORAGE MEDIUM", the entire contents of both of which are incorporated herein by reference for all purposes.

TECHNICAL FIELD

The present disclosure relates to the field of gaming and, in particular, to an information pushing method and apparatus, device and storage medium.

BACKGROUND

Current game applications are usually designed to provide tutorials for novice. Players can learn about the game's tutorial, such as how to play or strategy guide in a particular game scenario, before or during the game experience.

However, for novice players, it is easy to encounter difficulties during the game. Even though the novice players are provided with an entry to learn the tutorials, they cannot find exactly what they urgently need to learn at the moment due to the large number of tutorials, which affects their game experience.

SUMMARY

The present disclosure provides an information pushing method, device, and storage medium.

According to a first aspect, an information pushing method is provided by an embodiment of the present disclosure, in which a graphical user interface is obtained by executing a game application and rendering the game application on a display of a first terminal. The method includes:

- displaying a chat interface including at least two players on the graphical user interface, the at least two players including a first player corresponding to the first terminal and a second player corresponding to a second terminal;
- receiving a request for guidance initiated by the second player via the second terminal in the chat interface;
- acquiring, in response to a reply operation by the first player to the request for guidance via the first terminal, a target tutorial corresponding to the reply operation from a plurality of tutorials; and
- sending the target tutorial to the second terminal of the second player, the target tutorial being configured to guide the second player to play a game.

According to a second aspect, an electronic device is provided by an embodiment of the present disclosure, including:

- at least one processor, and
- memory communicatively coupled to the at least one processor; wherein
- the memory stores one or more instructions executable by the at least one processor, the one or more instructions being executed by the at least one processor to enable the electronic device to perform acts including: executing a game application and rendering the game application on a display of a first terminal to obtain a graphical user interface; displaying a chat interface including at least two players on the graphical user interface, the at least two players including a first player corresponding to the first terminal and a second player corresponding to a second terminal; receiving a request for guidance initiated by the second player via the second terminal in the chat interface; acquiring, in response to a reply operation by the first player to the request for guidance via the first terminal, a target tutorial corresponding to the reply operation from a plurality of tutorials; and sending the target tutorial to the second terminal of the second player, the target tutorial being configured to guide the second player to play a game.

According to a third aspect, a non-transitory computer-readable storage medium is provided by an embodiment of the present disclosure, the computer-readable storage medium having a computer program stored thereon, which, when executed by a processor, causes the processor to execute a game application and render the game application on a display of a first terminal to obtain a graphical user interface; display a chat interface including at least two players on the graphical user interface, the at least two players including a first player corresponding to the first terminal and a second player corresponding to a second terminal; receive a request for guidance initiated by the second player via the second terminal in the chat interface; acquire, in response to a reply operation by the first player to the request for guidance via the first terminal, a target tutorial corresponding to the reply operation from a plurality of tutorials; and send the target tutorial to the second terminal of the second player, the target tutorial being configured to guide the second player to play a game.

BRIEF DESCRIPTION OF THE DRAWINGS

In order to more clearly illustrate the technical solutions in the embodiments of the present disclosure or the related art, the accompanying drawings to be used in the embodiments or descriptions of the related art will be briefly described below. It is obvious that the accompanying drawings in the following description show some of the embodiments of the present disclosure, and for the person of ordinary skill in the art, other accompanying drawings can be obtained based on these drawings without making creative labor.

Figure 1:
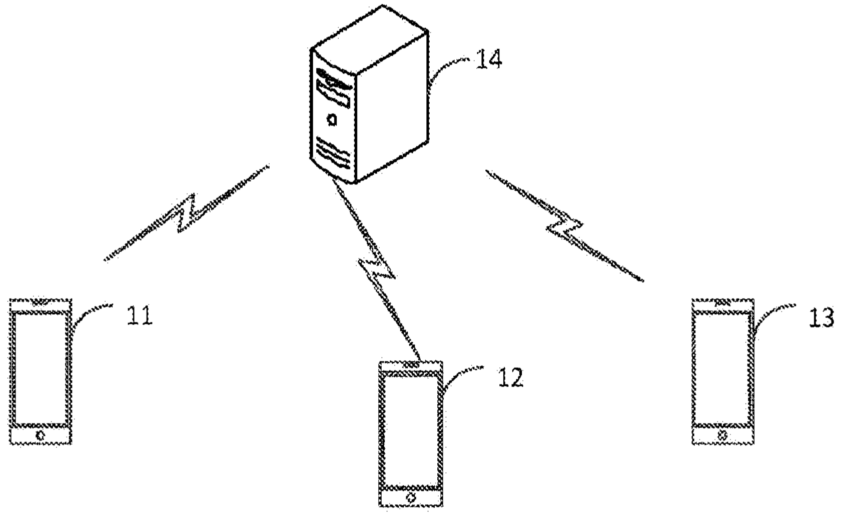
FIG. 1 is a schematic diagram of a scenario of an information pushing method provided by one or more embodiments of the present disclosure.

The foregoing accompanying drawings illustrate definite embodiments of the present disclosure, which will be described in greater detail below. These drawings and descriptions are not intended to limit the scope of concepts of the present disclosure in any way, but rather to illustrate the concepts of the present disclosure for those skilled in the art by reference to particular embodiments.

DETAILED DESCRIPTION

In order to make the purpose, technical solutions and advantages of the embodiments of the present disclosure clearer, the technical solutions in the embodiments of the present disclosure will be described clearly and completely in the following in conjunction with the accompanying drawings in the embodiments of the present disclosure. It is clear that the described embodiments are a part of the embodiments of the present disclosure, and not all of them. Based on the embodiments in the present disclosure, all other embodiments obtained by a person of ordinary skill in the art without making creative labor fall within the scope of protection of the present disclosure.

The terms "first", "second", "third", etc. in the specification, claims, and the accompanying drawings described above of the present disclosure are used to distinguish similar objects and not required to describe a particular order or sequence. It should be understood that the terms so used may be interchangeable, where appropriate, so that the embodiments of the present disclosure described herein can be implemented, for example, in an order other than those illustrated or described herein.

In addition, the terms "including" and "comprising", and any variations thereof, are intended to cover non-exclusive inclusion, e.g., a process, method, system, product, or device that includes a series of steps or units may not be limited to those steps or units clearly listed, but may include other steps or units that are not clearly listed or are inherent to the process, method, product, or device.

Most of the current game applications are designed with an entry for novice teaching. Usually, when novice players enter the game for the first time, they will first enter a novice teaching interface, but the novice teaching interface is often skipped and ignored by the players due to the players' eagerness to experience the game. In some cases, the players may not be able to memorize all the teaching contents. As a result, the novice players often encounter problems during the game.

In this regard, novice players can now learn the game in any one of the following ways. First, through the in-game chat system, novice players ask veteran players or close friends for advice on how to operate the game, or veteran players in the process of the game predict the problems that novice players may encounter, and teach novice players how to deal with the corresponding problems in the chat system. Secondly, novice players can always find out the operation methods for the corresponding problems through the entry for notice teaching on the game interface.

However, the first method mentioned above is limited to text or voice communication between players, and there is a certain degree of abstraction in information transmission, which makes it impossible for novice players to learn the game intuitively and makes the teaching efficiency between players low. Moreover, some of the novice players are too abstract in describing the problem, and the organization is not clear enough, which leads to the veteran players' answers deviating from the original problem, and the repetitive communication further affects the teaching efficiency. Although the second method above provides more intuitive and detailed teaching content, for novice players, due to unfamiliarity with what kind of strategy to use in a specific scene, so they cannot quickly access the game strategy matching the problem after entering the learning interface, which affects the game experience of novice players.

In view of the above problems, embodiments of the present disclosure provide an information pushing method, which mainly improves the information pushing for the first method mentioned above, so that a novice player can quickly and accurately obtain more intuitive teaching content or tutorial. Considering that it is not intuitive enough for the veteran player to teach the novice player the operation method through text or voice in the chat interface, the inventor has designed a control for selecting the teaching content or tutorial in the chat interface, so that the veteran player can push more intuitive tutorial, such as pictures, videos, etc., to the novice player by clicking and selecting the corresponding tutorial. Of course, in order to enhance the intelligence of the game service, text or voice recognition can also be used to obtain the semantic information of the text or voice sent by the veteran player to the novice player, and the system can automatically push more intuitive tutorial corresponding to the semantic information of the text or voice to the novice player while sending the text or voice input from the veteran player to enhance the efficiency of the teaching between the players.

Before describing the information push solution provided by embodiments of the present disclosure, a brief description of application scenarios of the information push solution is first provided.

For example, FIG. 1 shows a schematic diagram of a scenario of an information pushing method provided by embodiments of the present disclosure. As shown in FIG. 1, the scenario includes a plurality of terminal devices (e.g., terminal device 11, terminal device 12, and terminal device 13 in FIG. 1), and a game server 14, the plurality of terminal devices being communicatively connected to the game server 14, respectively.

Each terminal device corresponds to a player, for example, terminal device 11 corresponds to player A, terminal device 12 corresponds to player B, and terminal device 13 corresponds to player C. For example, player A and player B are friends with each other, and player A, player B, and player C are in the same battle team of the current game, with player A being a veteran player, and player B and player C being novice players.

In one scenario, player B initiates a request for guidance to player A through a chat interface between player A and player B. Player A may push more intuitive tutorial to player B, or more intuitive tutorial to player B as well as player C, via a control for selecting the tutorial on the chat interface.

In another scenario, player B initiates the request for guidance to player A via a group chat interface, where the group chat consists of player A, player B, and player C. Player A may push more intuitive tutorial to all players in the group chat via the control for selecting the tutorial on the group chat interface.

Based on the above application scenarios, the technical solutions of the present disclosure are described in detail in the following specific embodiments. These following specific embodiments may be combined with each other, and the same or similar concepts or processes may not be repeated in certain embodiments.

Figure 2:
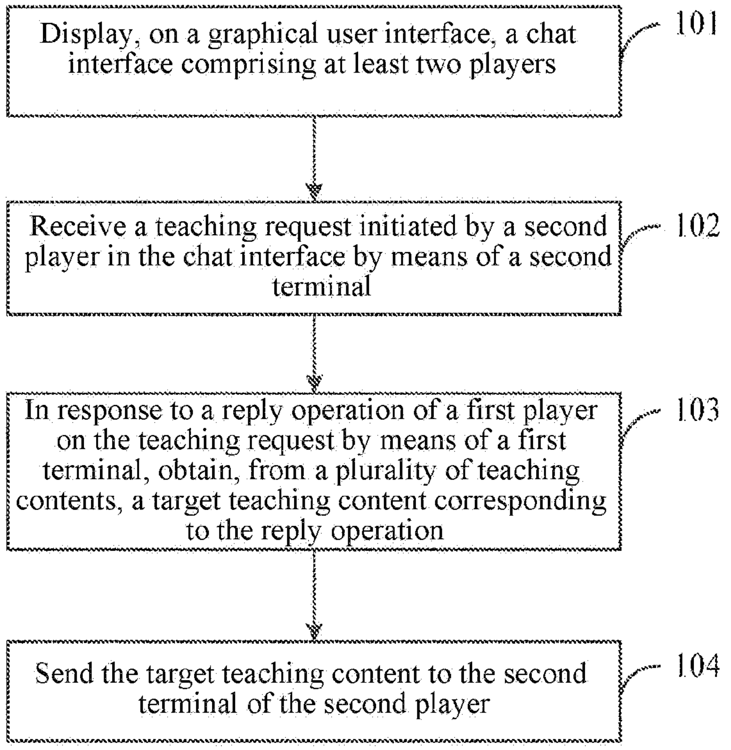
FIG. 2 is a first flowchart of an information pushing method provided by one or more embodiments of the present disclosure.

FIG. 2 is a first flowchart of an information pushing method provided by an embodiment of the present disclosure, in which a graphical user interface may be obtained by executing a game application and rendering the game application on a display of a first terminal. The information pushing method provided in this embodiment may be applied to a terminal device or a game server, and there is no limitation on this embodiment.

As shown in FIG. 2, the information pushing method provided by this embodiment includes the following steps 101-104.

Step 101, displaying a chat interface including at least two players on the graphical user interface.

Step 102, receiving a request for guidance initiated by a second player via a second terminal in the chat interface.

The at least two players includes a first player corresponding to the first terminal and the second player corresponding to the second terminal.

In an embodiment of the present disclosure, the chat interface may be a chat interface between two players, such as a chat interface between player A and player B. Player A is a novice player and player B is a veteran player. Player A and player B may have a buddy relationship or a player relationship in the same battle team. Player A may initiate a request for guidance to player B through the chat interface between player A and player B.

In an embodiment of the present disclosure, the chat interface may be a group chat interface of three or more players, such as a group chat interface including player A, player B, and player C. Player A and player C are novice players, and player B is a veteran player. Player A (or player C) may initiate a request for guidance to player B through the group chat interface.

In some embodiments, a plurality of players in the group chat interface may be all players in a battle team.

Step 103, acquiring, in response to a reply operation by the first player to the request for guidance via the first terminal, a target tutorial corresponding to the reply operation from a plurality of tutorials.

Step 104, sending the target tutorial to the second terminal of the second player.

The target tutorial is configured to guide the second player to play a game. The target tutorial includes a tutorial in at least one of followings forms: a picture, a video, a link.

In some embodiments, one or more target tutorials may be provided. For example, player A sends a question in a chat interface that involves 2 game strategies, and player B returns to player A one or more learning links for the 2 game strategies.

In an embodiment of the present disclosure, the reply operation of the first player includes a text input operation, and based on the text input operation, a target tutorial corresponding to the text input operation may be acquired from a plurality of tutorials.

In an embodiment of the present disclosure, the reply operation of the first player includes a voice input operation, and based on the voice input operation, a target tutorial corresponding to the voice input operation may be acquired from a plurality of tutorials.

In an embodiment of the present disclosure, the reply operation of the first player includes a selection operation, and based on the selection operation by the first player in the chat interface, a target tutorial corresponding to the selection operation may be acquired from a plurality of tutorials.

In the related solutions, the novice player initiates the request for guidance to the veteran player through chat, which is usually in the form of text or voice, and the veteran player usually replies to the request in the form of text or voice. For relatively simple questions, the novice player may well understand the content of the veteran player's reply in the form of text or voice, and carry out the corresponding game operations. However, for more complex questions, the novice player may not be able to perform the corresponding game operations smoothly according to the replies from the veteran player in the form of text or voice. That is, the current way of acquiring the tutorial through chat is not intuitive and inefficient.

To address the above problem, the target tutorial, in the present embodiment, is acquired from a plurality of pre-stored tutorials based on the reply operation of the veteran player, and more concrete tutorials (such as pictures or videos) or links to the tutorials are sent to enable the novice player to intuitively and quickly learn or master the relevant game operations, and to improve the game experience of the novice player.

The information pushing solutions provided in embodiments of the present disclosure may be applied to a game chat scenario, where the chat interface of the game includes at least two players. This solution, by receiving the request for guidance initiated by the second player through the second terminal in the chat interface, acquiring the target tutorial corresponding to the reply operation from a plurality of tutorials in response to the reply operation by the first player to the request for guidance via the first terminal, and sending the target tutorial to the second terminal of the second player, enables the second player to quickly and accurately obtain the game tutorial and improves the player's game experience.

In some embodiments, the first player may speculate on the problems encountered by other players in the game based on their game behaviors and performances in the game, and directly send the target tutorial to the other players in the chat interface through the first terminal, without waiting for the other players to send the request for guidance before performing the reply operation of the above embodiments.

In some embodiments, before sending the target tutorial to the second terminal of the second player, the information pushing method may further include the following step: determining a number of times the second terminal of the second player receives one or more tutorials during a predetermined time period. A tutorial received by the second terminal during the predetermined time period may be the same as, or different from, the target tutorial to be sent, which is not limited by the embodiments of the present disclosure.

For example, if the number of times the one or more tutorials are received is less than a predetermined number, the target tutorial will be sent to the second terminal of the second player. Alternatively, if the number of times the one or more tutorials are received is greater than or equal to the predetermined number, the target tutorial will not be sent to the second terminal of the second player.

The predetermined time period and predetermined number of times can be reasonably set according to the actual requirements, without any limitations by the embodiments of the present disclosure.

For example, the predetermined time period is set to 180 s, and the predetermined number of times is set to 1. If it is determined that the number of times the second terminal of the second player receives the one or more tutorials within 180 s is greater than or equal to 1, the target tutorial pushed by the first player for the second player is no longer sent to the second terminal of the second player. If it is determined that the number of times the second terminal of the second player receives the one or more tutorials within 180 s is 0 times, the target tutorial pushed by the first player for the second player will be sent to the second terminal of the second player.

The reason for the above embodiments may be that the second player sends the same request for guidance to more than one player at the same time, and some other player replies to the second player before the first player within the preset 180 s. In order to prevent the second player from receiving duplicated contents of the replies, or in other words, in order to prevent the second player from being interfered with unduly (it is sufficient to receive a reply once in the course of the game), the target tutorial may be sent or not through the above sending rules.

In some embodiments, after determining whether to send or not to send the target tutorial to the second terminal of the second player, the information pushing method may further include the following step: sending prompt information to the first terminal of the first player, the prompt information being configured to indicate whether the target tutorial has been pushed during a predetermined time period.

The above embodiments enable the first player to be informed whether the target tutorial of his/her reply has been sent successfully, and also enable the first player to be informed whether other players have replied to the second player on how to perform the game operation, so as to enhance the game experience of the player.

In response to the reply operation being a selection operation of the player in the chat interface, the process of pushing information will be described in detail below.

Figure 3:
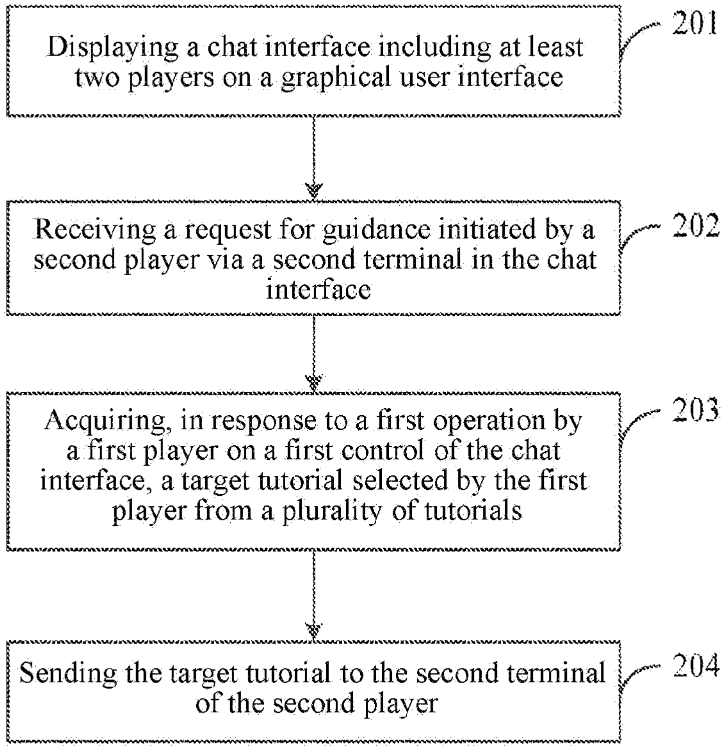
FIG. 3 is a second flowchart of an information pushing method provided by one or more embodiments of the present disclosure.

FIG. 3 is a second flowchart of an information pushing method provided by an embodiment of the present disclosure. As shown in FIG. 3, the information pushing method provided by this embodiment includes the following steps 201-204.

Step 201, displaying a chat interface including at least two players on a graphical user interface.

Step 202, receiving a request for guidance initiated by a second player via a second terminal in the chat interface.

Figure 4:
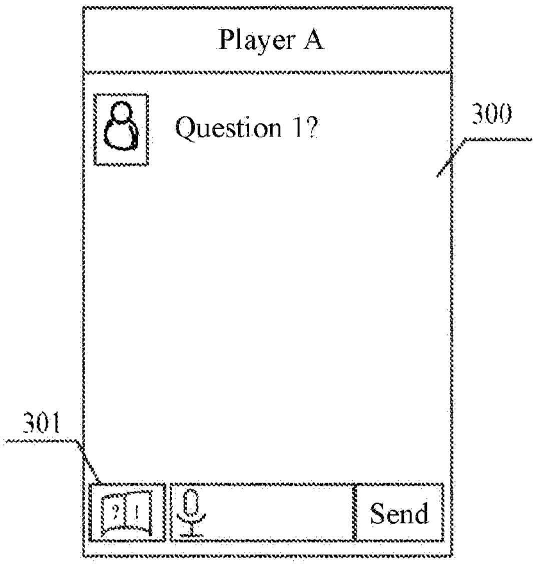
FIG. 4 is a first schematic diagram of a chat interface provided by one or more embodiments of the present disclosure.

In this embodiment, the chat interface includes a first control, the first control being used for the first player to select a target tutorial based on the request for guidance. For example, FIG. 4 is a first schematic diagram of a chat interface provided by embodiments of the present disclosure. As shown in FIG. 4, the chat interface 300 is a chat interface between player A and player B. Player A is a novice player, and player A sends questions to player B through the chat interface. The chat interface 300 includes a first control 301, and player B may push relevant tutorials to the player A by clicking the first control 301 of the chat interface 300.

Step 203, acquiring, in response to a first operation by the first player on the first control of the chat interface, the target tutorial selected by the first player from the plurality of tutorials.

Step 204, sending the target tutorial to the second terminal of the second player.

In this embodiment, the first operation is a selection operation performed by the first player in the chat interface.

In an embodiment of the present disclosure, in response to the first operation by the first player on the first control, a first selection window is displayed in the chat interface, and in response to a second operation by the first player on the first selection window, the target tutorial selected by the first player is acquired from the plurality of tutorials. The first selection window includes the plurality of tutorials selectable by the first player. The second operation is a selection operation of the first player at the first selection window.

In some embodiments, the first selection window displays the title of each tutorial. For example, taking a reasoning game which is based on werewolf culture as an example, the title of the tutorial may be “Voting Method”, “Character Marking Method”, “Abstention Method”, “Viewing Monitor Method”, “Marking Position Method”, “Emergency Muster Method”, and the like.

Figure 5:
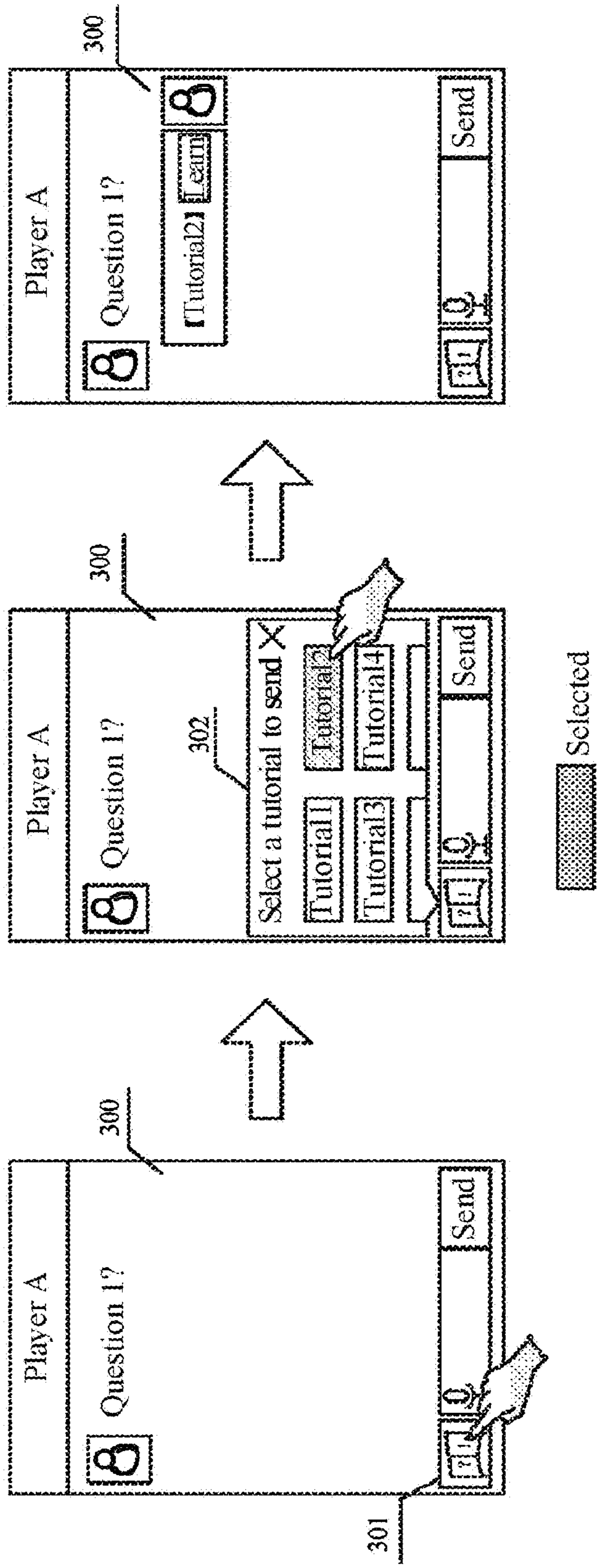
FIG. 5 is a first schematic diagram of a variation of a chat interface provided by one or more embodiments of the present disclosure.

For example, FIG. 5 is a first schematic diagram of a variation of a chat interface provided by an embodiment of the present disclosure. As shown in FIG. 5, a series of selection operations of player B in the chat interface 300 triggers the variation of the chat interface shown in FIG. 5. For example, player B clicks on a first control 301 of the chat interface 300 to display a first selection window 302 on the chat interface 300, the first selection window 302 including a plurality of tutorials available for player B to select. Player B clicks on one or more of the tutorials in the first selection window 302, such as clicking on a tutorial 2. After the tutorial 2 is acquired, the tutorial 2 is pushed to player A, which may be an image, a video, a link, etc. of the tutorial 2. FIG. 5 illustrates a link for pushing the tutorial 2 to player A. Player A may quickly and intuitively obtain the tutorial 2 by clicking on the link.

In some embodiments, after player B clicks on the one or more tutorials in the first selection window 302 and then clicks on the “Send” control on the chat interface 300, the selected one or more tutorials are acquired and the one or more tutorials are pushed to player A.

In some embodiments, if the number of tutorials is large, the first selection window 302 may display only a part of the tutorials, and player B may acquire the tutorials which are not displayed by means of a slider (not shown) in the first selection window 302, or by directly sliding up and down or sliding left and right in the first selection window 302.

It should be noted that player B may turn off (abort) the delivery of the tutorial at any time during the selection process.

In some embodiments, after receiving the target tutorial on the chat interface, player A may learn the game operation by clicking on the target tutorial, for example, by clicking on the "Learn" button in FIG. 5. Alternatively, if there is no need for learning, the target tutorial may be ignored to avoid being forced to learn.

In the information pushing solution provided by embodiments of the present disclosure, the request for guidance initiated by the second player through the second terminal in the chat interface is received; the target tutorial selected by the first player from the plurality of tutorials is acquired in response to the first operation of the first player acting on the first control of the chat interface; and the target tutorial is sent to the second terminal of the second player. This solution enables the second player to quickly and accurately obtain the game tutorial, and enhances the player's game experience.

In response to the reply operation being a text input operation of the player in the chat interface, the process of pushing information will be described in detail below.

Figure 6:
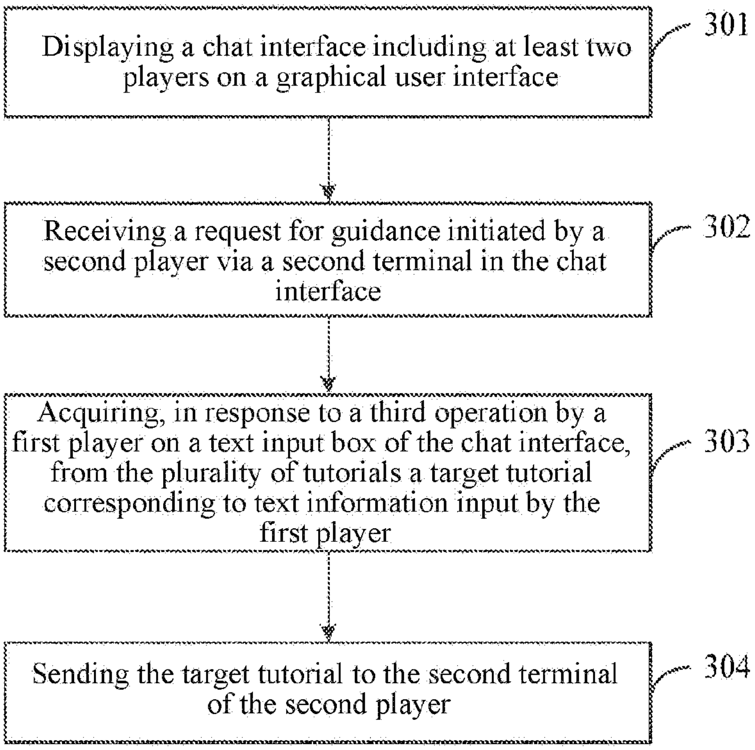
FIG. 6 is a third flowchart of an information pushing method provided by one or more embodiments of the present disclosure.

FIG. 6 is a third flowchart of an information pushing method provided by an embodiment of the present disclosure. As shown in FIG. 6, the information pushing method provided by this embodiment includes the following steps 301-304.

Step 301, displaying a chat interface including at least two players on a graphical user interface.

Step 302, receiving a request for guidance initiated by a second player via a second terminal in the chat interface.

Step 303, acquiring, in response to a third operation by the first player on a text input box of the chat interface, from the plurality of tutorials the target tutorial corresponding to text information input by the first player.

Step 304, sending the target tutorial to the second terminal of the second player.

In this embodiment, the third operation is a text input operation performed by the first player in the chat interface. The first player inputs text information in response to the request for guidance by clicking on a text input box in the chat interface. Different from the related solutions, the terminal device or the game server, after obtaining the text information inputted by the first player, may acquire the target tutorial corresponding to the text information from a plurality of pre-stored tutorials through text recognition, and send the target tutorial corresponding to the text information while sending the text information to the second player.

Figure 7:
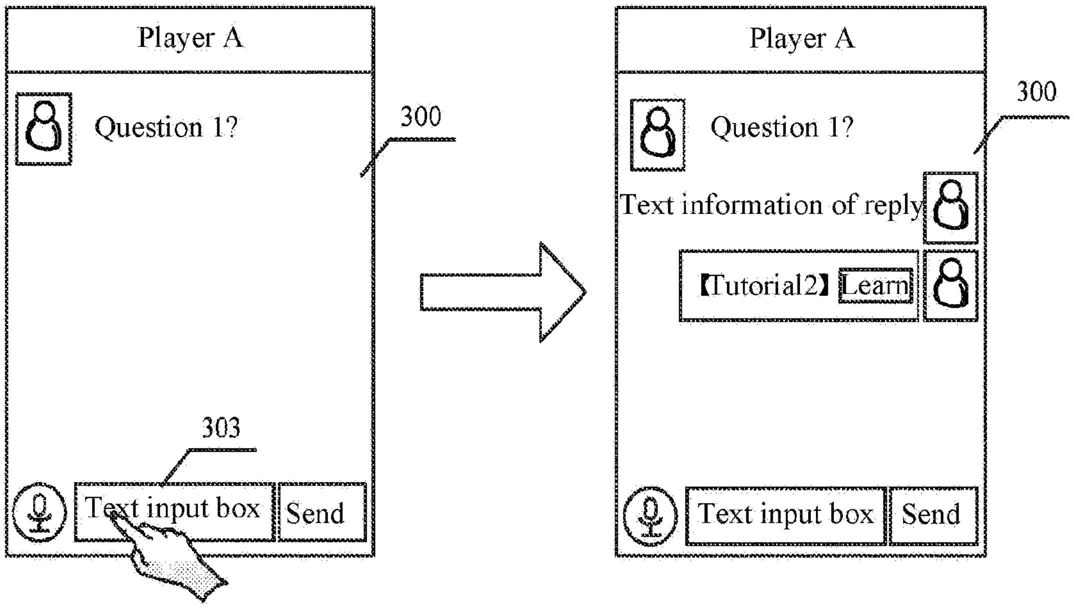
FIG. 7 is a second schematic diagram of a variation of a chat interface provided by one or more embodiments of the present disclosure.

For example, FIG. 7 is a second schematic diagram of a variation of a chat interface provided by an embodiment of the present disclosure. As shown in FIG. 7, player B receives a question 1 from player A in the chat interface 300, and in response to the question 1, player B replies to the question via a text input box 303. Player B sends the text information of reply to player A, and at the same time, pushes a link to the tutorial 2 corresponding to the text information to player A. Player A reads the text information replied by player B, and if player A is unable to fully understand the information, he/she can quickly and intuitively learn the tutorial 2 by clicking on the link.

In the information pushing solution provided by this embodiment of the present disclosure, the request for guidance initiated by the second player through the second terminal in the chat interface is received; the target tutorial corresponding to the text information input by the first player is acquired from the plurality of tutorials in response to the third operation of the first player acting on the text input box of the chat interface; and the target tutorial is sent to the second terminal of the second player. This solution enables the second player to quickly and accurately obtain the game tutorial, and enhances the player's game experience.

In response to the reply operation being a voice input operation of the player in the chat interface, the process of pushing information will be described in detail below.

Figure 8:
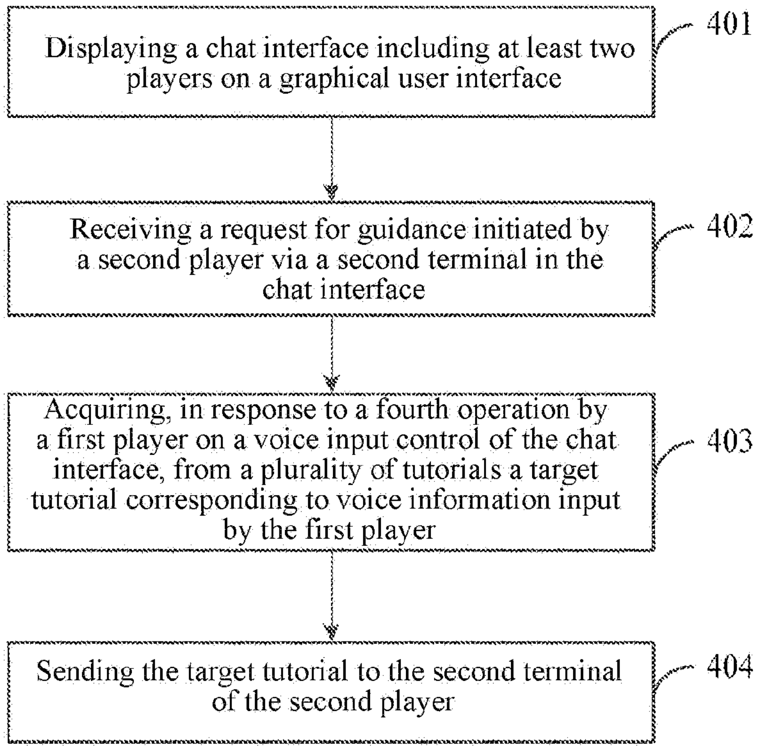
FIG. 8 is a fourth flowchart of an information pushing method provided by one or more embodiments of the present disclosure.

FIG. 8 is a fourth flowchart of an information pushing method provided by an embodiment of the present disclosure. As shown in FIG. 8, the information pushing method provided by this embodiment includes the following steps 401-404.

Step 401, displaying a chat interface including at least two players on a graphical user interface.

Step 402, receiving a request for guidance initiated by a second player via a second terminal in the chat interface.

Step 403, acquiring, in response to a fourth operation by the first player on a voice input control of the chat interface, from the plurality of tutorials the target tutorial corresponding to voice information input by the first player.

Step 404, sending the target tutorial to the second terminal of the second player.

In this embodiment, the fourth operation is a voice input operation performed by the first player in the chat interface. The first player inputs voice information in response to the request for guidance by clicking a voice input control in the chat interface. Different from the related solutions, the terminal device or the game server, after obtaining the voice information input by the first player, may acquire the target tutorial corresponding to the voice information from a plurality of pre-stored tutorials through voice recognition, and send the target tutorial corresponding to the voice information while sending the voice information to the second player.

Figure 9:
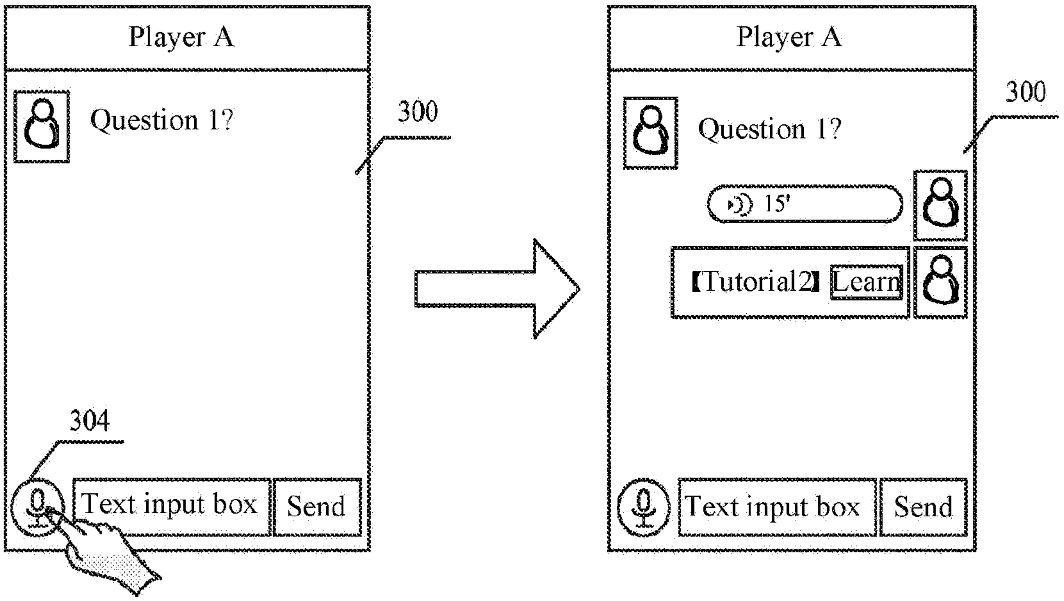
FIG. 9 is a third schematic diagram of a variation of a chat interface provided by one or more embodiments of the present disclosure.

For example, FIG. 9 is a third schematic diagram of a variation of a chat interface provided by embodiments of the present disclosure. As shown in FIG. 9, player B receives a question 1 from player A in the chat interface 300, and in response to the question 1, player B replies to the question via a voice input control 304. Player B sends the voice information to player A, and at the same time, pushes a link to the tutorial 2 corresponding to the voice information to player A. Player A reads the voice information from player B, and if player A is unable to fully understand the information, he/she can quickly and intuitively learn the tutorial 2 by clicking on the link.

In the information pushing solution provided by this embodiment of the present disclosure, the request for guidance initiated by the second player through the second terminal in the chat interface is received; the target tutorial corresponding to the voice information input by the first player is acquired from the plurality of tutorials in response to the fourth operation of the first player acting on the voice input control of the chat interface; and the target tutorial is sent to the second terminal of the second player. This solution enables the second player to quickly and accurately obtain the game tutorial, and enhances the player's game experience.

In the above several embodiments, the novice player sends a request for guidance to the veteran player through the chat interface in the game application, and the request may include a question in the form of text or voice. In order to facilitate that the veteran player is able to quickly respond to the novice player's question, the information pushing solution is further optimized in the following embodiment, which includes the following steps.

Step 1, acquiring gameplay statistics of the second player during a predetermined time period in response to the request for guidance initiated by the second player via the second terminal in the chat interface.

Step 2, sending the gameplay statistics to the first terminal of the first player.

In this embodiment, the gameplay statistics of the second player during the predetermined time period are used to indicate various index parameters of the second player during the game in the predetermined time period. For example, taking a multiplayer competitive game as an example, in response to a request for guidance initiated by a novice player in a chat interface, the game server may compile statistics on the novice player's combat failures in the game over a past period of time (e.g., within 30 minutes), such as the number of consecutive failures when the novice player attacked monsters in an instance dungeon in a certain node or scenario, the equipment carried, the skills used, and other statistics.

The gameplay statistics may be used as reference data for the veteran player to select the target tutorial, which makes it easy for the veteran player to analyze the reasons why the novice player fail to operate and to quickly decide what target tutorial that the novice player need to learn.

In some embodiments, the gameplay statistics are displayed on the chat interface of the first terminal and the chat interface of the second terminal. That is, the chat interfaces of the first player and the second player may display the gameplay statistics of the second player during the predetermined time period, and both the first player and the second player may see the gameplay statistics of the second player during the predetermined time period.

In some embodiments, the gameplay statistics are displayed on the chat interface of the first terminal. That is, the gameplay statistics of the second player during the predetermined time period are visible only to the first player.

Figure 10:
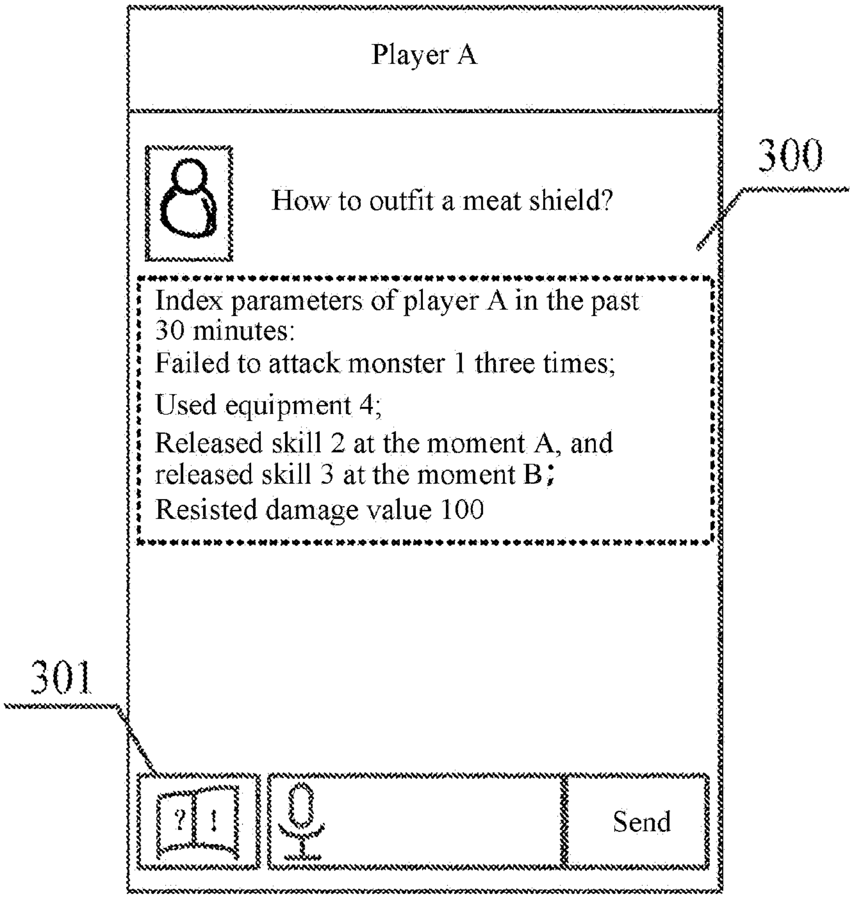
FIG. 10 is a second schematic diagram of a chat interface provided by one or more embodiments of the present disclosure.

For example, FIG. 10 is a second schematic diagram of a chat interface provided by embodiments of the present disclosure. As shown in FIG. 10, the chat interface 300 is a chat interface between player A and player B and player A is a novice player. Player A sends a question, such as "How to outfit a meat shield?" to player B through the chat interface. The game server, upon receiving the above question sent by player A, acquires the gameplay statistics of player A during a predetermined time period, for example, player A has failed to attack monster 1 three times, used equipment 4, released skill 2 at the moment A, and released skill 3 at the moment B, etc. in the past 30 minutes. While the game server pushes the above question to player B, it may also push the obtained gameplay statistics of player A during the predetermined time period. Through the chat interface of player B, the question sent by player A and the gameplay statistics of player A may be seen at the same time. By means of the gameplay statistics, player B may quickly and accurately find out where the problem of player A lies, and then determine an appropriate game tutorial to push to player A, which improves the teaching efficiency.

In the information pushing solution provided by this embodiment, upon receiving the request for guidance sent from the second terminal of the second player, the gameplay statistics of the second player during the predetermined time period are acquired, and the gameplay statistics of the second player are sent to the first terminal while sending the quest for guidance to the first terminal of the first player. The first player may conduct a comprehensive analysis based on the gameplay statistics and push targeted tutorials to the second player, which may improve the response speed and the accuracy of the response to the request for guidance and enhance the player's game experience.

Figure 11:
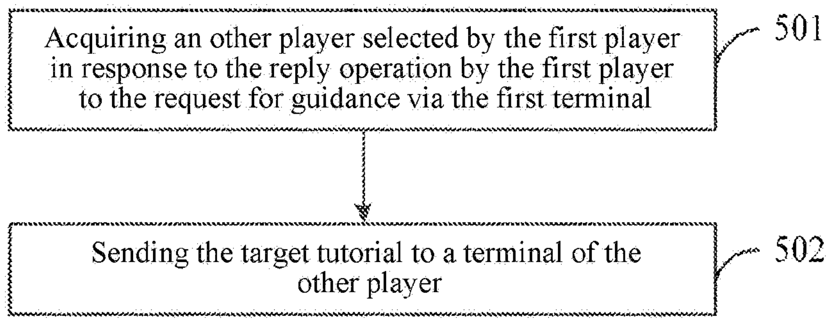
FIG. 11 is a fifth flowchart of an information pushing method provided by one or more embodiments of the present disclosure.

FIG. 11 is a fifth flowchart of an information pushing method provided by an embodiment of the present disclosure. On the basis of any of the above embodiments, as shown in FIG. 11, the information pushing method of this embodiment may further include the following steps 501 and 502.

Step 501, acquiring an other player selected by the first player in response to the reply operation by the first player to the request for guidance via the first terminal.

Step 502, sending the target tutorial to a terminal of the other player.

In some embodiments, the other player selected by the first player may be determined by the following steps 5011 and 5012.

Step 5011, displaying, in response to a first operation by the first player on a first control of the chat interface, a second selection window in the chat interface.

The first operation is a selection operation performed by the first player in the chat interface. The second selection window includes a plurality of players selectable by the first player.

In some embodiments, the players selectable by the first player in the second selection window include at least one of: a player who is a close friend of the first player, a player who is on the same battle team as the first player, and the first player. The second player is a player who is a close friend of the first player or a player who is on the same battle team as the first player.

Step 5012, acquiring, in response to a fifth operation by the first player on the second selection window, the other player selected by the first player.

The fifth operation is a selection operation performed by the first player in the second selection window.

In some embodiments, the other player includes the first player. That is, the first player is allowed to send the target tutorial to himself or herself.

Figure 12:
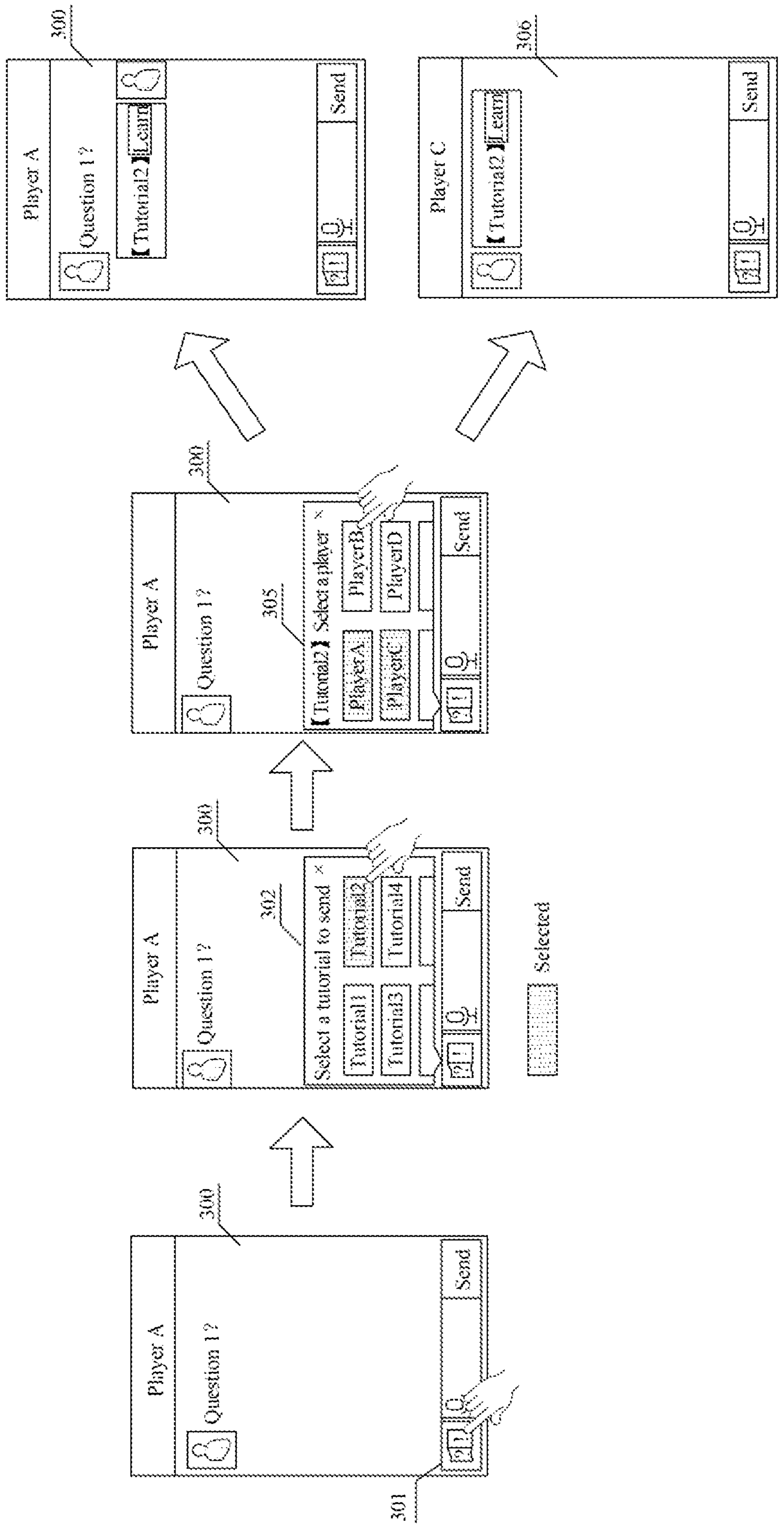
FIG. 12 is a fourth schematic diagram of a variation of a chat interface provided by one or more embodiments of the present disclosure.

For example, FIG. 12 is a fourth schematic diagram of a variation of a chat interface provided by embodiments of the present disclosure. As shown in FIG. 12, player B receives a question 1 from player A in the chat interface 300, and in response to the question 1, player B clicks on a first control 301 of the chat interface 300, and a first selection window 302 is displayed on the chat interface 300. The first selection window 302 includes a plurality of tutorials selectable by player B. Player B clicks on one or more tutorials in the first selection window 302, for example, by clicking on a tutorial 2, and then, a second selection window 305 is displayed on the chat interface 300. The second selection window 305 includes a plurality of players selectable by player B, for example, player A, player B, player C and player D. Player B clicks on one or more players in the second selection window 305, for example, by clicking on player A and player C. Accordingly, a link to the tutorial 2 is pushed on the chat interface 300 between player A and player B; and a link to the tutorial 2 is pushed on the chat interface 306 between player B and player C which is a player who did not initiate the request for guidance.

The information pushing solution provided in this embodiment is a further extension of the information pushing solution of any of the above embodiments, in which, while the first player sends the target tutorial to the second terminal of the second player, based on the other player (including the first player himself or herself) of the same battle team selected by the first player, the same target tutorial may also be sent to the terminal of the other player. This solution may improve the efficiency of the teaching of the veteran player to the novice player.

Embodiments of the present disclosure may divide the information pushing apparatus into functional modules according to the above method embodiments, for example, individual functional modules may be divided corresponding to individual functions, or two or more functions may be integrated in a single processing module. The above integrated modules can be implemented either in the form of hardware or in the form of software function modules. It should be noted that the division of the modules in the embodiments of the present disclosure is schematic and is only a logical division of functions, and there may be other ways of division when actually realized. The following is an example of each function module divided by the corresponding function.

Figure 13:
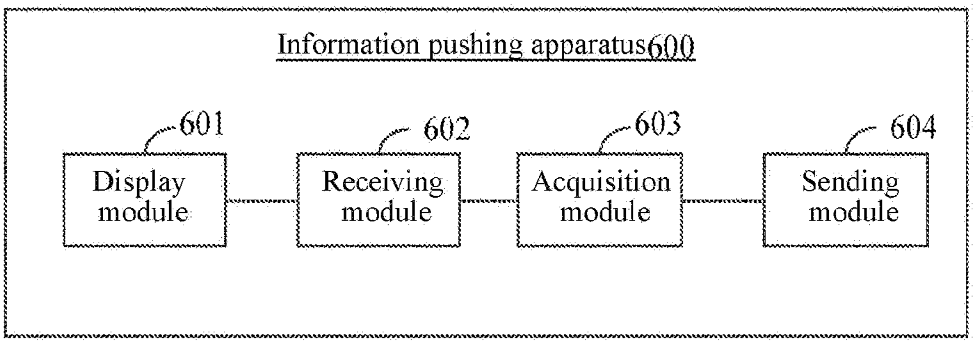
FIG. 13 is a first schematic diagram of a structure of an information pushing apparatus provided by one or more embodiments of the present disclosure.

FIG. 13 is a first schematic diagram of a structure of an information pushing apparatus provided by an embodiment of the present disclosure. As shown in FIG. 13, the information pushing apparatus 600 provided by this embodiment includes: a display module 601, a receiving module 602, an acquisition module 603, and a sending module 604.

The display module 601 is configured to display a chat interface including at least two players on a graphical user interface, the at least two players including a first player corresponding to a first terminal and a second player corresponding to a second terminal.

The receiving module 602 is configured to receive a request for guidance initiated by the second player via the second terminal in the chat interface.

The acquisition module 603 is configured to acquire, in response to a reply operation by the first player to the request for guidance via the first terminal, a target tutorial corresponding to the reply operation from a plurality of tutorials.

The sending module 604 is configured to send the target tutorial to the second terminal of the second player, the target tutorial being configured to guide the second player to play a game.

In an embodiment of the present disclosure, the target tutorial includes a tutorial in at least one of followings forms: a picture, a video, a link.

In an embodiment of the present disclosure, the acquisition module 603 is further configured to: acquire, in response to a first operation by the first player on a first control of the chat interface, the target tutorial selected by the first player from the plurality of tutorials.

In an embodiment of the present disclosure, the display module 601 is further configured to display a first selection window in the chat interface in response to the first operation by the first player on the first control, the first selection window including the plurality of tutorials selectable by the first player.

The acquisition module 603 is further configured to acquire, in response to a second operation by the first player on the first selection window, the target tutorial selected by the first player from the plurality of tutorials.

In an embodiment of the present disclosure, the acquisition module 603 is further configured to: acquire, in response to a third operation by the first player on a text input box of the chat interface, from the plurality of tutorials the target tutorial corresponding to text information input by the first player.

In an embodiment of the present disclosure, the acquisition module 603 is further configured to: acquire, in response to a fourth operation by the first player on a voice input control of the chat interface, from the plurality of tutorials the target tutorial corresponding to voice information input by the first player.

In an embodiment of the present disclosure, the acquisition module 603 is further configured to: acquire gameplay statistics of the second player during a predetermined time period in response to the request for guidance initiated by the second player via the second terminal in the chat interface.

The sending module 604 is further configured to send the gameplay statistics to the first terminal of the first player.

In an embodiment of the present disclosure, the acquisition module 603 is further configured to: acquire an other player selected by the first player in response to the reply operation by the first player to the request for guidance via the first terminal.

The sending module 604 is further configured to send the target tutorial to a terminal of the other player.

In an embodiment of the present disclosure, the display module 601 is further configured to display, in response to a first operation by the first player on a first control of the chat interface, a second selection window in the chat interface, the second selection window including a plurality of players selectable by the first player.

The acquisition module 603 is further configured to acquire, in response to a fifth operation by the first player on the second selection window, the other player selected by the first player.

In an embodiment of the present disclosure, the other player includes the first player.

Figure 14:
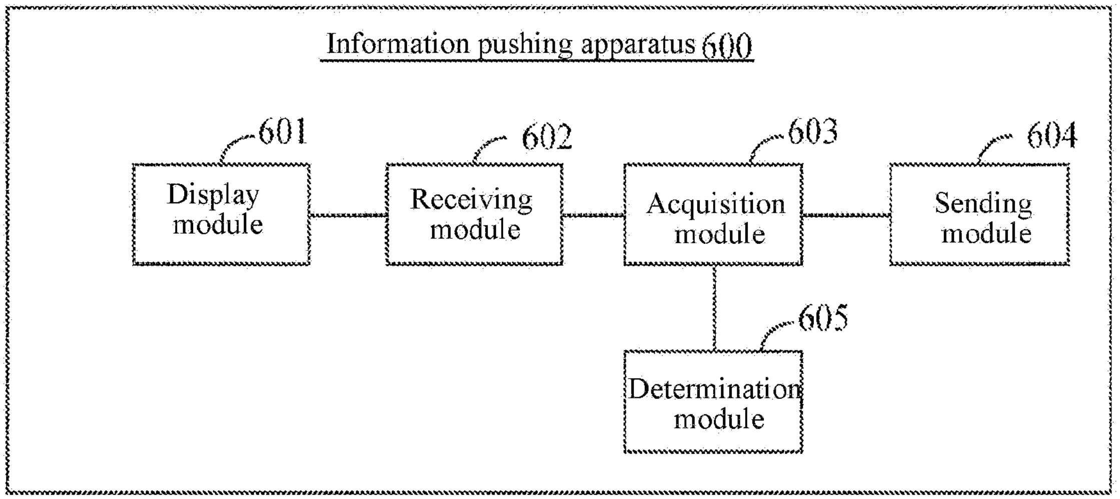
FIG. 14 is a second schematic diagram of a structure of an information pushing apparatus provided by one or more embodiments of the present disclosure.

FIG. 14 is a second schematic diagram of a structure of an information pushing apparatus provided by an embodiment of the present disclosure. As shown in FIG. 14, the apparatus, on the basis of the apparatus shown in FIG. 13, further includes a determination module 605.

In an embodiment of the present disclosure, the determination module 605 is configured to determine a number of times the second terminal of the second player receives one or more tutorial during a predetermined time period.

If the number is less than a predetermined number, the sending module 604 is configured to send the target tutorial to the second terminal of the second player.

In an embodiment of the present disclosure, the sending module 604 is further configured to: send prompt information to the first terminal of the first player, the prompt information being configured to indicate whether the target tutorial has been pushed during a predetermined time period.

The information pushing apparatus provided in the embodiments of the present disclosure is used to perform the technical solutions in any of the preceding method embodiments, which has implementation principles and technical effects similar to those of the method embodiments that will not be repeated herein.

Figure 15:
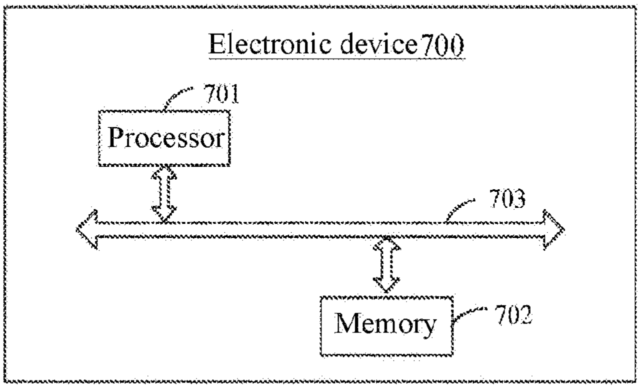
FIG. 15 is a schematic diagram of a hardware structure of an electronic device provided by one or more embodiments of the present disclosure.

FIG. 15 is a schematic diagram of a hardware structure of an electronic device provided by an embodiment of the present disclosure. As shown in FIG. 15, the electronic device of this embodiment may include at least one processor 701 (only one processor is shown in FIG. 15), and memory 702 communicatively coupled to the at least one processor 701.

The memory 702 stores one or more instructions executable by the at least one processor 701, the one or more instructions being executed by the at least one processor 701 to enable the electronic device 700 to perform the technical solutions in any of the preceding method embodiments.

In some embodiments, the memory 702 may either be standalone or integrated with the processor 701.

When the memory 702 is a device independent of the processor 701, the electronic device 700 further includes: a bus 703 for connecting the memory 702 to the processor 701.

The electronic device provided by embodiments of the present disclosure may perform the technical solutions of any of the preceding method embodiments, which has implementation principles and technical effects similar to those of the method embodiments that will not be repeated herein.

Embodiments of the present disclosure also provide a computer-readable storage medium, the computer-readable storage medium having one or more computer-executable instructions stored therein, which, when executed by a processor, are used to realize the technical solutions in any of the preceding method embodiments.

Embodiments of the present disclosure provide a computer program product including a computer program, which, when executed by a processor, causes the technical solution in any of the preceding method embodiments to be realized.

Embodiments of the present disclosure also provide a chip including: a processing module and a communication interface, the processing module being capable of executing the technical solutions in the preceding method embodiments.

Further, the chip further includes a storage module (e.g., a memory), the storage module being configured to store one or more instructions. The processing module is configured to execute the one or more instructions stored in the storage module, and the execution of the one or more instructions stored in the storage module causes the processing module to execute the technical solutions in the preceding method embodiments.

It should be understood that the above processor or processing module may be a Central Processing Unit (CPU), but also other general-purpose processor, Digital Signal Processor (DSP), Application Specific Integrated Circuit (ASIC), and so on. The general-purpose processor may be a microprocessor or the processor may be any conventional processor and the like. The steps of the method disclosed in conjunction with the invention may be directly embodied as being performed by a hardware processor, or performed with a combination of hardware and software modules in the processor.

The memory may include a high-speed RAM memory or may also include a non-volatile memory (NVM), such as at least one disk memory, and may also be a USB flash drive, a removable hard disk, a read-only memory, a disk or a CD-ROM, and the like.

The bus can be an Industry Standard Architecture (ISA) bus, a Peripheral Component (PCI) bus, or an Extended Industry Standard Architecture (EISA) bus, and so on. The buses may be categorized as address buses, data buses, control buses, and the like. For ease of representation, the bus in the accompanying drawings of this disclosure is not limited to only one bus or one type of bus.

The storage medium described above may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disks, or CD-ROMs. The storage medium may be any available medium that can be accessed by a general-purpose or specialized computer.

An exemplary storage medium is coupled to a processor such that the processor is capable of reading information from the storage medium and may write information to the storage medium. Of course, the storage medium may also be an integral part of the processor. The processor and the storage medium may be located in Application Specific Integrated Circuits (ASICs). Of course, the processor and the storage medium may also be present in the electronic device as discrete components.

Finally, it should be noted that the above embodiments are only used to illustrate the technical solutions of the present disclosure, not to limit them. Although the present disclosure has been described in detail with reference to the foregoing embodiments, a person of ordinary skill in the art should understand that it is still possible to make modifications to the technical solutions in the foregoing embodiments, or to make equivalent substitutions for some or all of the technical features therein, and these modifications or substitutions does not take the essence of the corresponding technical solutions to depart from the scope of the technical solutions of the embodiments of the present disclosure.

What is claimed is:

1. An information pushing method, wherein the method is executed by a first terminal and comprises:

executing a game application and rendering the game application on a display of the first terminal, through a processor of the first terminal, to obtain a graphical user interface;

displaying, through a display of the first terminal, a chat interface comprising at least two players on the graphical user interface, the at least two players comprising a first player corresponding to the first terminal and a second player corresponding to a second terminal;

receiving, through the processor of the first terminal, a request for guidance initiated by the second player via the second terminal in the chat interface;

acquiring, through the processor of the first terminal, in response to a reply operation by the first player to the request for guidance via the first terminal, based on gameplay statistics of the second player, a target tutorial corresponding to the reply operation from a plurality of tutorials, wherein acquiring the target tutorial corresponding to the reply operation from the plurality of tutorials comprises:

acquiring, through the processor of the first terminal, during a first predetermined time period, the gameplay statistics of the second player from the second terminal and game behavior data of other players, wherein the gameplay statistics are used to indicate game skills usage of the second player at any historical moment;

displaying, through the display of the first terminal, the gameplay statistics and the game behavior data in the chat interface;

receiving, through the processor of the first terminal, text information and voice information input by the first player; and determining, through the processor of the first terminal, the target tutorial based on the gameplay statistics, the text information and the voice information;

determining, through the processor of the first terminal, based on the gameplay statistics of the second player and the game behavior data of other players, a third player not sending the request for guidance from the other players;

determining, through the processor of the first terminal, a number of times the second terminal of the second player receives one or more tutorial during a second predetermined time period; and sending, in response to the number being less than a predetermined number, the target tutorial to the second terminal of the second player and a third terminal of the third player, the target tutorial being configured to guide the second player and the third player to play a game.

2. The method of claim 1, wherein the target tutorial comprises a tutorial in at least one of followings forms: a picture, a video, or a link.

3. The method of claim 1, wherein the chat interface comprises a first control, and wherein acquiring the target tutorial corresponding to the reply operation from the plurality of tutorials further comprises:

acquiring, in response to a first operation by the first player on the first control of the chat interface, the target tutorial selected by the first player from the plurality of tutorials.

4. The method of claim 3, further comprising:

displaying a first selection window in the chat interface in response to the first operation by the first player on the first control, the first selection window comprising the plurality of tutorials selectable by the first player; and acquiring, in response to a second operation by the first player on the first selection window, the target tutorial selected by the first player from the plurality of tutorials.

5. The method of claim 1, wherein determining the target tutorial comprises:

acquiring, in response to a third operation by the first player on a text input box of the chat interface, from the plurality of tutorials the target tutorial corresponding to text information input by the first player; or acquiring, in response to a fourth operation by the first player on a voice input control of the chat interface, from the plurality of tutorials the target tutorial corresponding to voice information input by the first player.

6. The method of claim 1, wherein determining the third player not sending the request for guidance comprises:

displaying, in response to a first operation by the first player on a first control of the chat interface, a second selection window in the chat interface, the second selection window comprising a plurality of players selectable by the first player; and acquiring, in response to a fifth operation by the first player on the second selection window, the third player not sending the request for guidance.

7. The method of claim 1, further comprising:

sending prompt information to the first terminal of the first player, the prompt information being configured to indicate whether the target tutorial has been pushed during a predetermined time period.

8. The method of claim 1, wherein the chat interface comprises a group chat interface and the at least two players further comprise the third player, and any two players of the at least two players have a buddy relationship or a player relationship in a same battle team.

9. An electronic device, comprising:

at least one processor, and memory communicatively coupled to the at least one processor; wherein the memory stores one or more instructions executable by the at least one processor, the one or more instructions being executed by the at least one processor to enable the electronic device to perform acts comprising:

executing a game application and rendering the game application on a display of a first terminal, through a processor of the first terminal, to obtain a graphical user interface;

displaying, through a display of the first terminal, a chat interface comprising at least two players on the graphical user interface, the at least two players comprising a first player corresponding to the first terminal and a second player corresponding to a second terminal;

receiving, through the processor of the first terminal, a request for guidance initiated by the second player via the second terminal in the chat interface;

acquiring, through the processor of the first terminal, in response to a reply operation by the first player to the request for guidance via the first terminal, based on gameplay statistics of the second player, a target tutorial corresponding to the reply operation from a plurality of tutorials, wherein acquiring the target tutorial corresponding to the reply operation from the plurality of tutorials comprises:

acquiring, through the processor of the first terminal, during a first predetermined time period, the gameplay statistics of the second player from the second terminal and game behavior data of other players, wherein the gameplay statistics are used to indicate game skills usage of the second player at any historical moment;

displaying, through the display of the first terminal, the gameplay statistics and the game behavior data in the chat interface;

receiving, through the processor of the first terminal, text information and voice information input by the first player; and determining, through the processor of the first terminal, the target tutorial based on the gameplay statistics, the text information and the voice information;

determining, through the processor of the first terminal, based on the gameplay statistics of the second player and the game behavior data of other players, a third player not sending the request for guidance from the other players;

determining, through the processor of the first terminal, a number of times the second terminal of the second player receives one or more tutorial during a second predetermined time period; and sending, in response to the number being less than a predetermined number, the target tutorial to the second terminal of the second player and a third terminal of the third player, the target tutorial being configured to guide the second player and the third player to play a game.

10. The electronic device of claim 9, wherein the chat interface comprises a first control; the one or more instructions being executed by the at least one processor to enable the electronic device to perform acts further comprising:

acquiring, in response to a first operation by the first player on the first control of the chat interface, the target tutorial selected by the first player from the plurality of tutorials.

11. The electronic device of claim 10, wherein the one or more instructions are executed by the at least one processor to enable the electronic device to perform acts further comprising:

displaying a first selection window in the chat interface in response to the first operation by the first player on the first control, the first selection window comprising the plurality of tutorials selectable by the first player; and acquiring, in response to a second operation by the first player on the first selection window, the target tutorial selected by the first player from the plurality of tutorials.

12. The electronic device of claim 9, wherein the one or more instructions are executed by the at least one processor to enable the electronic device to perform acts further comprising:

acquiring, in response to a third operation by the first player on a text input box of the chat interface, from the plurality of tutorials the target tutorial corresponding to text information input by the first player; or acquiring, in response to a fourth operation by the first player on a voice input control of the chat interface, from the plurality of tutorials the target tutorial corresponding to voice information input by the first player.

13. A non-transitory computer readable storage medium having a computer program stored thereon, wherein the computer program, when executed by a processor, causes the processor to:

execute a game application and render the game application on a display of a first terminal to obtain a graphical user interface;

display a chat interface comprising at least two players on the graphical user interface, the at least two players comprising a first player corresponding to the first terminal and a second player corresponding to a second terminal;

receive a request for guidance initiated by the second player via the second terminal in the chat interface;

acquire, in response to a reply operation by the first player to the request for guidance via the first terminal, based on gameplay statistics of the second player, a target tutorial corresponding to the reply operation from a plurality of tutorials, wherein the computer program further causes the processor to:

acquire, during a first predetermined time period, the gameplay statistics of the second player from the second terminal and game behavior data of other players, wherein the gameplay statistics are used to indicate game skills usage of the second player at any historical moment;

display the gameplay statistics and the game behavior data in the chat interface;

receive text information and voice information input by the first player; and determine the target tutorial based on the gameplay statistics, the text information and the voice information;

determine based on the gameplay statistics of the second player and the game behavior data of other players, a third player not sending the request for guidance from the other players;

determine a number of times the second terminal of the second player receives one or more tutorial during a second predetermined time period; and send, in response to the number being less than a predetermined number, the target tutorial to the second terminal of the second player and a third terminal of the third player, the target tutorial being configured to guide the second player and the third player to play a game.

* * * * *